United States Patent
Furukawa et al.

(10) Patent No.: US 9,644,255 B2
(45) Date of Patent: May 9, 2017

(54) SURFACE TREATMENT METHOD FOR METAL MATERIAL AND MOLD TREATED BY SURFACE TREATMENT METHOD

(75) Inventors: Yuichi Furukawa, Toyota (JP); Masahiro Okumiya, Nagoya (JP); Yoshiki Tsunekawa, Nagoya (JP); Nao Kumemoto, Nagoya (JP); Fumio Kawahara, Toyota (JP); Katsuhiro Takami, Toyota (JP)

(73) Assignees: TOYOTA JIDOSHA KABUSHIKI KAISHA, Toyota-shi, Aichi-ken (JP); TOYOTA SCHOOL FOUNDATION, Nagoya-shi, Aichi-ken (JP); MEC INTERNATIONAL CO. LTD., Toyota, Aichi (JP)

( * ) Notice: Subject to any disclaimer, the term of this patent is extended or adjusted under 35 U.S.C. 154(b) by 453 days.

(21) Appl. No.: 14/114,060

(22) PCT Filed: Apr. 12, 2012

(86) PCT No.: PCT/IB2012/000845
§ 371 (c)(1),
(2), (4) Date: Oct. 25, 2013

(87) PCT Pub. No.: WO2012/146977
PCT Pub. Date: Nov. 1, 2012

(65) Prior Publication Data
US 2014/0048182 A1     Feb. 20, 2014

(30) Foreign Application Priority Data

Apr. 28, 2011 (JP) ................. 2011-101602

(51) Int. Cl.
| | |
|---|---|
| C23C 8/26 | (2006.01) |
| C23C 8/80 | (2006.01) |
| C21D 1/68 | (2006.01) |
| C21D 1/72 | (2006.01) |
| C21D 1/74 | (2006.01) |
| C21D 7/06 | (2006.01) |
| C01B 31/02 | (2006.01) |
| C23C 8/24 | (2006.01) |
| B82Y 30/00 | (2011.01) |
| B82Y 40/00 | (2011.01) |

(52) U.S. Cl.
CPC ............... *C23C 8/80* (2013.01); *B82Y 30/00* (2013.01); *B82Y 40/00* (2013.01); *C01B 31/0206* (2013.01); *C21D 1/68* (2013.01); *C21D 1/72* (2013.01); *C21D 1/74* (2013.01); *C21D 7/06* (2013.01); *C23C 8/24* (2013.01); *C23C 8/26* (2013.01)

(58) Field of Classification Search
CPC ......... C22C 38/00; C22C 38/02; C22C 38/04; C22C 38/06; C22C 38/08
See application file for complete search history.

(56) References Cited

U.S. PATENT DOCUMENTS

| | | | |
|---|---|---|---|
| 2011/0104368 A1 | 5/2011 | Furukawa | |
| 2011/0127403 A1 | 6/2011 | Furukawa et al. | |
| 2011/0133053 A1* | 6/2011 | Furukawa | ............. B22C 3/00 249/115 |

FOREIGN PATENT DOCUMENTS

| | | |
|---|---|---|
| EP | 2 314 399 A1 | 4/2011 |
| JP | 2008-105082 A | 5/2008 |
| JP | 2010-036194 A | 2/2010 |
| JP | 2011-092972 A | 5/2011 |
| JP | 2011-110587 A | 6/2011 |

OTHER PUBLICATIONS

Grigorovich, V. K., et al. "Carbonitriding of high-carbon steels." Metal Science and Heat Treatment 23.11 (1981): 750-752.*
Agrawal, Archana, and K. K. Sahu. "An overview of the recovery of acid from spent acidic solutions from steel and electroplating industries." Journal of hazardous materials 171.1 (2009): 61-75.*
Lessells, J. M., and W. M. Murray. "Effect of shot blasting on strength of metals—Part II and III." Heat Treating and Forging (1941): 516, 557-568.*
F. F Hasler and N. Stone, The whys and hows of sulfuric acid pickling and recovery, Esco Engineering Ontario Booklet, Feb. 1995.*
International Search Report for corresponding International Patent Application No. PCT/IB2012/000845 mailed Oct. 16, 2012.

* cited by examiner

*Primary Examiner* — Roy King
*Assistant Examiner* — Jophy S Koshy
(74) *Attorney, Agent, or Firm* — Sughrue Mion, PLLC

(57) ABSTRACT

A surface treatment method for a metal material is provided which includes applying diluted sulfuric acid to a surface of the metal material that is composed primarily of iron, performing a heat treatment on the metal material in the presence of at least one of CO, $CO_2$ and organic gas under nitriding conditions under which a nitrided layer is formed in a superficial layer of the metal material after the application of the diluted sulfuric acid to form a carbon film which includes at least one of carbon nanocoils, carbon nanotubes and carbon nanofilaments on a surface of the nitrided layer of the metal material.

8 Claims, 16 Drawing Sheets

ELECTRON MICROSCOPE IMAGE

C Ka1_2

O Ka1

COMPARATIVE EXAMPLE 1

COMPARATIVE EXAMPLE 1

COMPARATIVE EXAMPLE 2

COMPARATIVE EXAMPLE 2

COMPARATIVE EXAMPLE 2

O Kα1

COMPARATIVE EXAMPLE 3

400 μm   ELECTRON MICROSCOPE IMAGE

COMPARATIVE EXAMPLE 3

C Ka1_2

COMPARATIVE EXAMPLE 3

O Ka1

⊏▭▭⊐ 300 nm          BF

⊏▭▭⊐ 300 nm 300 nm     S K 300 nm     Fe K

S Kα1

N Kα1_2

SURFACE TREATMENT METHOD FOR METAL MATERIAL AND MOLD TREATED BY SURFACE TREATMENT METHOD

BACKGROUND OF THE INVENTION

1. Field of the Invention

The present invention related to a surface treatment method for a metal material, and a mold that is treated by the surface treatment method. More specifically, the present invention relates to a method for the formation of a carbon film on a surface of a metal material and a mold that has a cavity surface with a carbon film formed thereon.

2. Description of Related Art

A specific treatment (surface treatment) is sometimes performed on a surface of a mold (in particular, casting mold or forging mold) for such purposes as preventing seizure. As one method, a surface treatment method in which a nitrided layer is formed in a superficial layer of a metal material (mold) and a carbon film is formed on the nitrided layer has been developed (for example, Japanese Patent Application Publication No. 2010-36194 (JP 2010-36194 A) and Japanese Patent Application Publication No. 2008-105082 (JP 2008-105082 A). In the method that is disclosed in JP 2010-36194 A and JP 2008-105082 A, a nanocarbon film formation process in which the mold is subjected to a heat treatment in the presence of acetylene gas and hydrogen sulfide gas in a nitriding atmosphere is carried out. The term "nanocarbon film" refers to a carbon film which contains at least one nanocarbon material that is selected from the group that consists of carbon nanocoils, carbon nanotubes and carbon nanofilaments. A nitrided layer is formed in the vicinity of the surface (in a superficial layer) of the mold and a nanocarbon film is formed on the nitrided layer by a nanocarbon film formation process. Here, a compound layer is formed between the nitrided layer and the nanocarbon film. The term "nitrided layer" refers to a layer that is formed when nitrogen penetrates inside a superficial layer of a mold that is made of an iron or an alloy which contains iron.

It is believed that, in the surface treatment method that is disclosed in JP 2010-36194 A and JP 2008-105082 A, the hydrogen sulfide gas reacts with iron (Fe) that is contained in the metal material to form an Fe—S compound and a nanocarbon film is formed on a surface of the metal material by the catalytic action of the Fe—S compound. When hydrogen sulfide gas is contained in the reaction gas, a nanocarbon film is formed on a surface of the metal material. However, a reaction system that uses hydrogen sulfide gas requires high equipment and production costs.

SUMMARY OF THE INVENTION

The present invention provides a technique to form a nanocarbon film on a surface of a metal material using diluted sulfuric acid instead of hydrogen sulfide gas. A first aspect of the present invention includes applying diluted sulfuric acid to a surface of a metal material that is composed primarily of iron, performing a heat treatment on the metal material in the presence of at least one of CO, $CO_2$ and organic gas under nitriding conditions under which a nitrided layer is formed in a superficial layer of the metal material after the application of the diluted sulfuric acid to form a carbon film that includes at least one of carbon nanocoils, carbon nanotubes and carbon nanofilaments on a surface of the nitrided layer of the metal material.

The Fe that is included in the metal material reacts with the diluted sulfuric acid to form a Fe sulfate which induces the formation of a nanocarbon film on the surface of the metal material. The reaction gas does not have to include hydrogen sulfide gas. Because diluted sulfuric acid is easier to handle than hydrogen sulfide gas, equipment and production costs can be reduced.

To perform a heat treatment on the metal material under conditions under which a nitrided layer is formed includes to perform a heat treatment on the metal material in a nitriding gas atmosphere that includes ammonia gas, nitrogen gas or urea, for example. The metal material may be subjected to a heat treatment in the presence of a nitriding component other than a gas. In other words, to perform a heat treatment on the metal material under conditions under which a nitrided layer is formed may be regarded as "heating the metal material in the presence of a nitrogen-including substance in the form of a gas or liquid until a nitrided layer is formed in the surface of the metal material." As the organic gas, any well-known organic gas from which a nanocarbon film can be formed on a surface of a metal material by performing a heat treatment in a nitriding atmosphere can be used. Suitable examples of the organic gas include gases of hydrocarbons which have a carbon number of approximately 1 to 4 (such as acetylene gas, ethylene gas, propane gas, butane gas and methane gas) and a mixture thereof (such as natural gas), and the use of acetylene gas is especially preferred.

The nitrided layer may be formed in the superficial layer of the metal material in an ammonia gas atmosphere.

Stress may be applied to the superficial layer of the metal material before the application of diluted sulfuric acid to the surface of the metal material. In addition, fullerene may be applied to a surface of the carbon film formed. The metal material may be sintered after the application of fullerene to a surface of the carbon film.

A second aspect of the present invention provides a mold that has a cavity surface on which a carbon film is formed by the surface treatment method.

According to the present invention, a nanocarbon film can be formed on a surface of a metal material without the use of hydrogen sulfide gas. Thus the equipment and production cost necessary to form a nanocarbon film on a surface of a metal material can be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
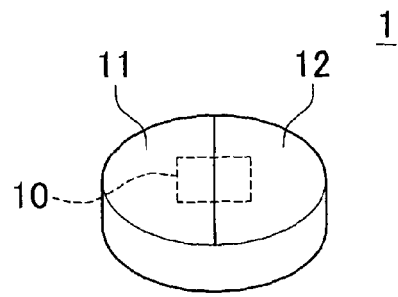
FIG. 1 is a diagram that schematically illustrates a metal material test piece for use in Example.

An embodiment of the present invention provides a surface treatment method of a metal material that is composed primarily of iron (Fe). The surface treatment method includes a first step and a second step. In the first step, diluted sulfuric acid is applied to a surface of a metal material that is composed primarily of iron (Fe). The first step is followed by the second step. In the second step, the metal material is subjected to a heat treatment in the presence of at least one that is selected from the group that consists of CO, $CO_2$ and organic gas under nitriding conditions under which a nitrided layer is formed in the superficial layer of the metal material to form a carbon film (nanocarbon film) which contains at least one nanocarbon material that is selected from the group that consists of carbon nanocoils, carbon nanotubes and carbon nanofilaments on a surface of the nitrided layer of the metal material.

The method for applying diluted sulfuric acid to a surface of the metal material in the first step is not specifically limited. The diluted sulfuric acid may be applied with a cloth or brush, or the metal material may be immersed in diluted sulfuric acid. After the application of diluted sulfuric acid, the metal material may be dried by any method, such as natural drying or drying by heating, to remove water on the surface of the metal material. The concentration of the diluted sulfuric acid is equal to or higher than 0.01 mol/L and equal to of lower than 20 mol/L, preferably equal to or higher than 1.0 mol/L and equal to or lower than 5.0 mol/L, and more preferably equal to or higher than 0.3 mol/L and equal to or lower than 0.6 mol/L.

When diluted sulfuric acid is applied, Fe as a primary component of the metal material reacts with the diluted sulfuric acid to form an Fe sulfate and hydrogen as represented by formula (1) or (2). The Fe sulfate ($FeSO_4$, $Fe_2(SO_4)_3$) that is formed as a result of the reaction serves as a catalyst in the reaction that forms a nanocarbon film and promotes the nanocarbon film forming reaction in the second step.

$$Fe+H_2SO_4 \rightarrow FeSO_4+H_2\uparrow \quad (1)$$

$$2Fe+3H_2SO_4 \rightarrow Fe_2(SO_4)_3+3H_2\uparrow \quad (2)$$

On the other hand, in the reaction system in the embodiment, $H_2S$ is formed when the reactions that are represented by formulae (3) and (4) below occur. Because the reaction represented by formula (4) does not occur unless FeS is formed, the reaction that forms $H_2S$ gas (the reaction represented by formula (4)) hardly occurs. Because $H_2S$ gas is hardly formed when diluted sulfuric acid is applied, the equipment and production costs can be reduced.

$$Fe+S \rightarrow FeS \quad (3)$$

$$FeS+H_2SO_4 \rightarrow FeSO_4+H_2\uparrow \quad (4)$$

In the second step, the metal material is subjected to a heat treatment in the presence of at least one that is selected from the group that consists of CO, $CO_2$ and organic gas under conditions under which a nitrided layer is formed in a superficial layer of the metal material (which is hereinafter referred to as "nitriding conditions"). As a result, nitrogen penetrates a region near the surface of the metal material (superficial layer) and the original metal material is nitrided to form a nitrided layer, and a nanocarbon film is formed on a surface of the nitrided layer. One preferred example in which the metal material is subjected to a heat treatment under conditions under which a nitrided layer is formed is to perform a heat treatment on the metal material in a nitriding gas atmosphere that contains ammonia gas, nitrogen gas or urea as described above. As the organic gas, any well-known organic gas from which a nanocarbon film can be formed on a surface of a metal material by performing a heat treatment in a nitriding atmosphere can be used. One suitable example of the organic gas is a hydrocarbon gas, such as acetylene gas, as described above.

The surface treatment method according to the embodiment may include steps other than the first and second steps. For example, the second step may be followed by a fullerene applying step in which fullerene is applied to a surface of the nanocarbon film that has been formed in the second step. The term "fullerene" refers to a carbon cluster that has a closed-shell structure and usually has an even carbon number between 60 and 130. Specific examples include $C_{60}$, $C_{70}$, $C_{76}$, $C_{78}$, $C_{80}$, $C_{82}$, $C_{84}$, $C_{86}$, $C_{88}$, $C_{90}$, $C_{92}$, $C_{94}$, $C_{96}$ and higher-order carbon clusters. The term "fullerene" as used herein is intended to include, in addition to the above substances, fullerene derivatives that are obtained by chemically modifying fullerene molecules with other molecules or functional groups. The fullerene applying step can be carried out by a method that is disclosed in JP 2010-36194 A, for example.

In addition, the fullerene applying step may be followed by a sintering step in which the metal material with a carbon film formed thereon is sintered, for example. When a sintering step is carried out, the fullerene becomes amorphous and forms metallic bonds with the nanocarbon film. Therefore, the carbon film is densified and strengthened, resulting in improved durability of the carbon film. In the sintering step, the metal material is preferably heated to a temperature of 400° C. or higher.

In addition, a stress imparting step in which stress is imparted to a superficial layer of the metal material may be included before the first step, for example. More specifically, a step in which shot blasting is performed on the surface of the metal material to form a residually-stressed layer which has crystal defects or crystal strain to a predetermined depth from the superficial layer in the metal material, for example. In addition, shot blasting makes the surface stress of the treatment surface uniform and imparts residual compressive stress to the treatment surface, thereby making effects of removing a superficial layer or extraneous matters from the treatment surface and/or improving the durability of the treatment surface. For example, the roughness of the surface to be treated can be adjusted by adjusting the shot-blasting conditions.

The blasting method for use in the shot blasting includes, but not be limited to, mechanical, pneumatic and wet blasting methods, for example. Examples of the abrasive material, include metal and ceramic blasting materials. The use of a blasting material of the same material as the mold to be treated is preferred but not limited to. The state of the surface to be treated can be adjusted by adjusting the size and material of the blasting material and the pressure during shot blasting (the pressure at which blasting material is blasted). For example, the roughness of the surface to be treated can be adjusted to a desired level.

According to this embodiment, a metal material that is provided with a carbon film which contains a nanocarbon material can be produced. In this embodiment, the nanocarbon film is formed on a surface of a metal material that is composed primarily of iron (Fe) by performing a heat treatment on the metal material in the presence of at least one that is selected from the group that consists of CO, $CO_2$ and organic gas under nitriding conditions under which a nitrided layer is formed in a superficial layer of the metal material after applying diluted sulfuric acid on the surface of the metal material. The metal material may be a mold, in which case the carbon film is preferably formed at least on a cavity surface of the mold.

[Example]

In this example, a test piece 1, which is made of hot-die steel SKD61 (JIS standard) as schematically shown in FIG. 1, was used as a metal material. The test piece 1 had a cylindrical shape with upper and lower surfaces with a diameter of 20 mm and a height of 8 mm.

(Shot blasting step) In this example, shot blasting was performed as a stress imparting step prior to the first step. Shot blasting was performed on the test piece 1 with its left half covered with a masking tape, and then the masking tape was removed. As a result, an untreated surface 11 and a treated surface 12 were formed on the top surface of the test piece 1.

The shot blasting was carried out by blasting steel grit with a diameter of 0.075 mm to 0.300 mm at a shot blasting pressure (air pressure) of 0.5 MPa onto the surface of the metal material for 30 seconds using a self-weight type nozzle blasting apparatus. The surface roughness Ra of the treated surface 12 after the shot blasting was within 1.5±0.4 μm.

(First step) Using a cloth that was impregnated with 3 mol/L of diluted sulfuric acid, 3 mol/L of diluted sulfuric acid was applied to the surface of the test piece, and the test piece was dried naturally.

Figure 2:
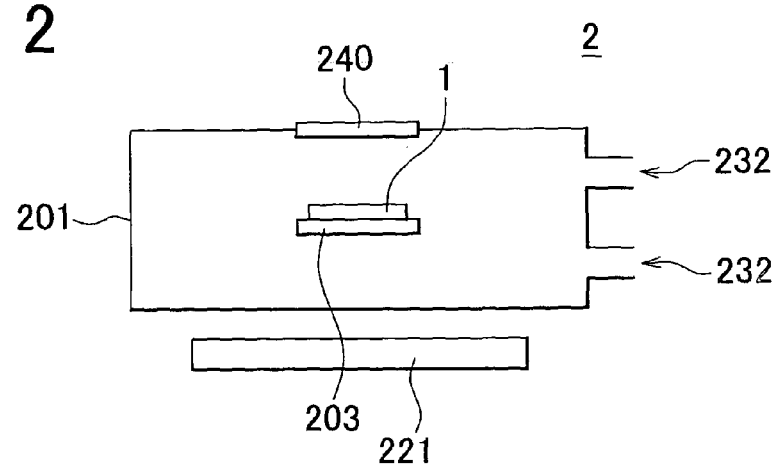
FIG. 2 is a diagram that conceptually illustrates a heat treatment furnace for use in Example.
Figure 3:
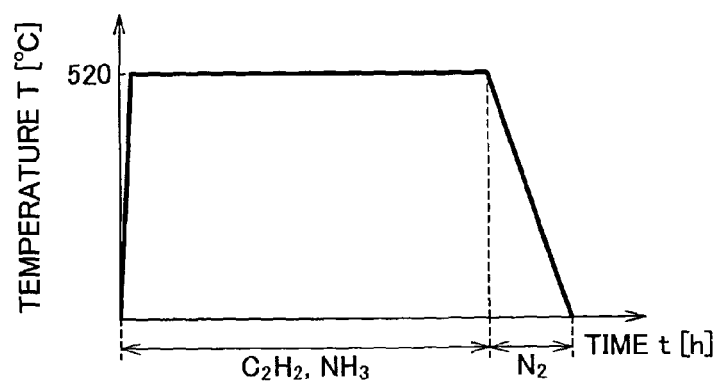
FIG. 3 is a diagram that illustrates a temperature profile in a second step of Example.
Figure 4:
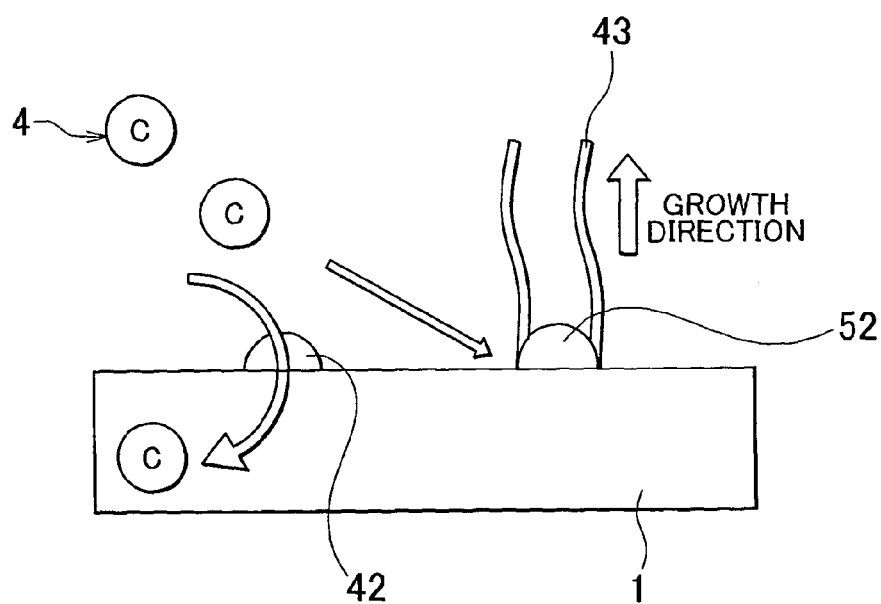
FIG. 4 is a diagram that conceptually illustrates a nanocarbon film formation mechanism.

(Second step) In the second step, the test piece 1 was placed in a heat treatment furnace 2 that is shown in FIG. 2, and the test piece 1 was heated according to the profile that is shown in FIG. 3 with a reaction gas being passed through the heat treatment furnace 2. The heat treatment furnace 2 includes a chamber 201, gas flow paths 232, a heater 221, a sample table 203, and a sample observation window 240. The test piece 1 was placed on the sample table 203 and the chamber 201 was evacuated with a vacuum pump (not shown) to purge the air therein. Then, nitrogen gas ($N_2$) was supplied to the chamber 201 to establish an $N_2$ atmosphere therein. The temperature in the chamber 201 was increased to 520° C. in 5 minutes with a reaction gas (acetylene ($C_2H_2$) gas and ammonia ($NH_3$) gas) being passed through the chamber 201 and then maintained at 520° C. for 3 hours. The flow rates of the components in the reaction gas were 0.15 L/min for $NH_3$ gas, 0.045 L/min for $C_2H_2$ gas, and 0.07 L/min for $N_2$ gas, and the pressure in the chamber was equal to the atmospheric pressure. After maintaining at 520° C. for 3 hours, the supply of $NH_3$ gas and $C_2H_2$ gas was stopped and $N_2$ gas was supplied instead, and the temperature in the chamber was reduced to approximately room temperature. FIG. 4 is a diagram that illustrates the mechanism by which nanocarbons grow in the presence of an Fe sulfate, such as $FeSO_4$, the details of which are described at the end of the description of Examples.

Comparative Example 1 A test piece which was identical with the test piece 1 was prepared and the same steps as those in Example were followed except that the first step was not carried out.

Comparative Example 2 A test piece which was identical with the test piece 1 was prepared and the same steps as those in Example were followed except that 6 mol/L of hydrochloric acid (HCl), instead of diluted sulfuric acid, was applied to the test piece in the first step.

Comparative Example 3 A test piece which was identical with the test piece 1 was prepared and the same steps as those in Example were followed except that 6 mol/L of nitric acid ($HNO_3$), instead of diluted sulfuric acid, was applied to the test piece in the first step.

(Observation under SEM and TEM, and EDS analysis) After treating the test pieces 1 according to the procedure of Example and Comparative Examples 1 to 3, an observation region 10 on the test piece 1 that is shown in FIG. 1 (which included a part of the untreated surface 11, a part of the treated surface 12 and the boundary therebetween) was observed under a scanning electron microscope (SEM). In addition, an energy dispersive X-ray analysis (EDS) was performed on the SEM observation region. The SEM observation and EDS analysis was performed with a scanning electron microscope SUPERSCAN SS-550, manufactured by Shimadzu Corporation.

Figure 5:
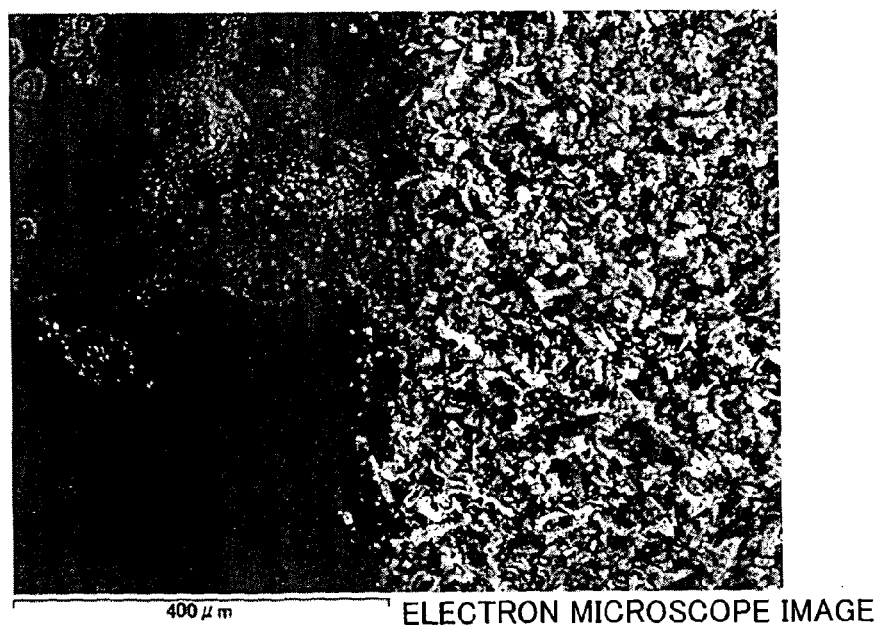
FIG. 5 is an SEM secondary electron image of the sample of Example.
Figure 6:
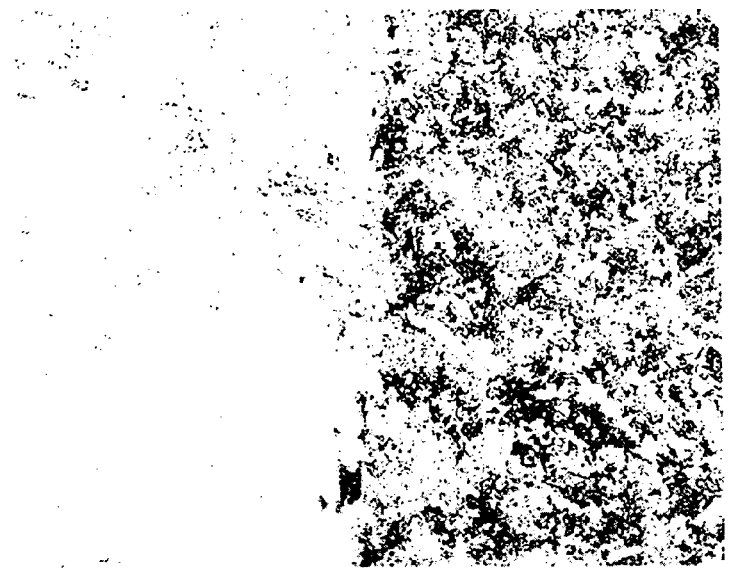
FIG. 6 is a diagram that shows a result of EDS mapping for the sample of Example.
Figure 7:
FIG. 7 is a diagram that shows a result of EDS mapping for the sample of Example.
Figure 8:
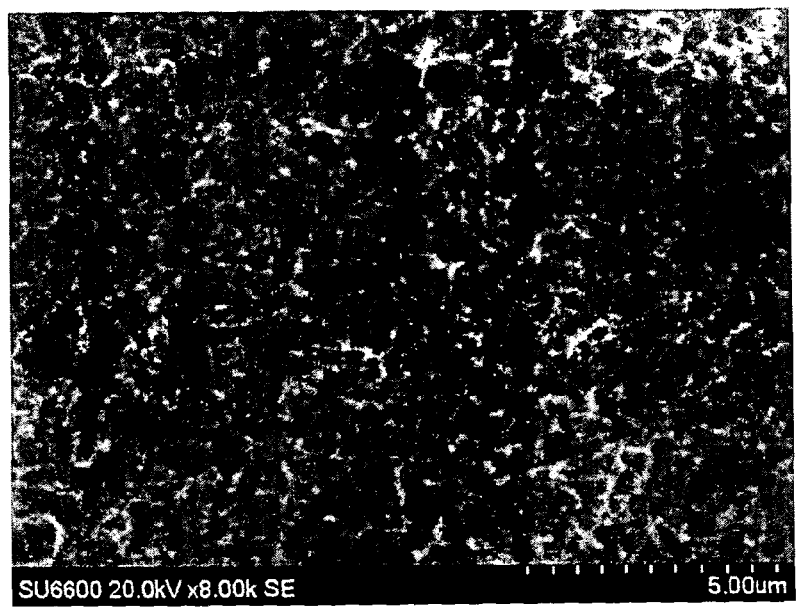
FIG. 8 is an enlarged image of an untreated surface that is shown in FIG. 5.
Figure 9:
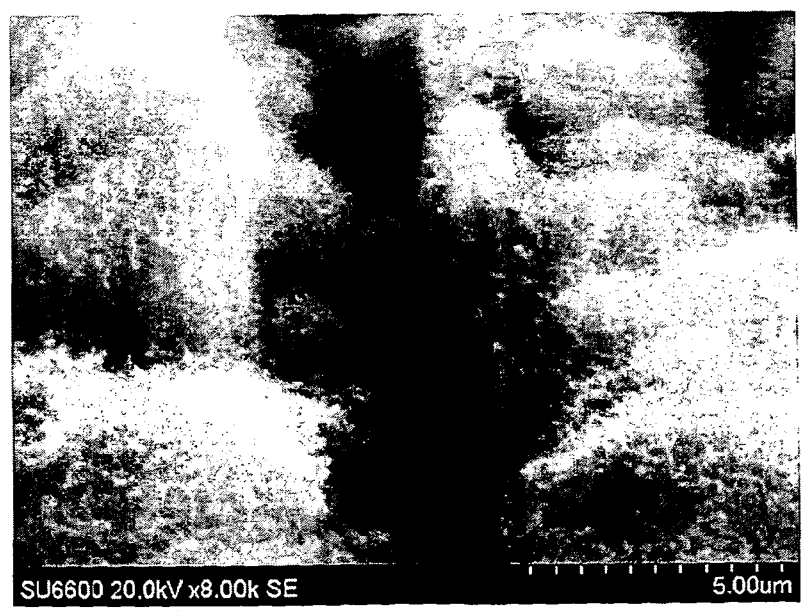
FIG. 9 is an enlarged image of a shot-blasted surface that is shown in FIG. 5.
Figure 10:
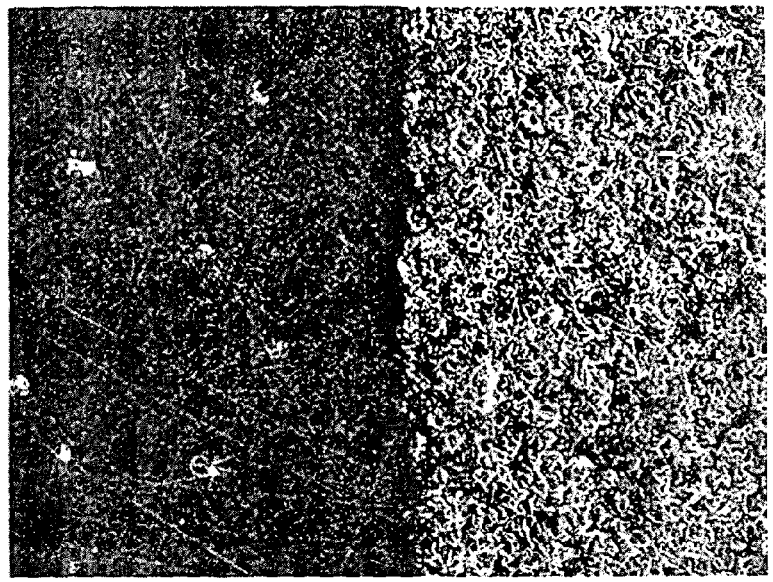
FIG. 10 is an SEM secondary electron image of the sample of Comparative Example 1.
Figure 11:
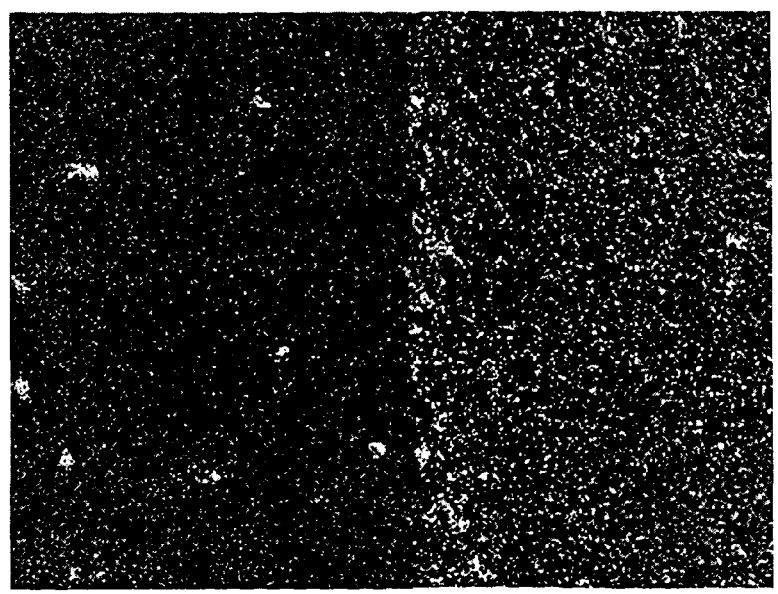
FIG. 11 is a diagram that shows a result of EDS mapping for the sample of Comparative Example 1.
Figure 12:
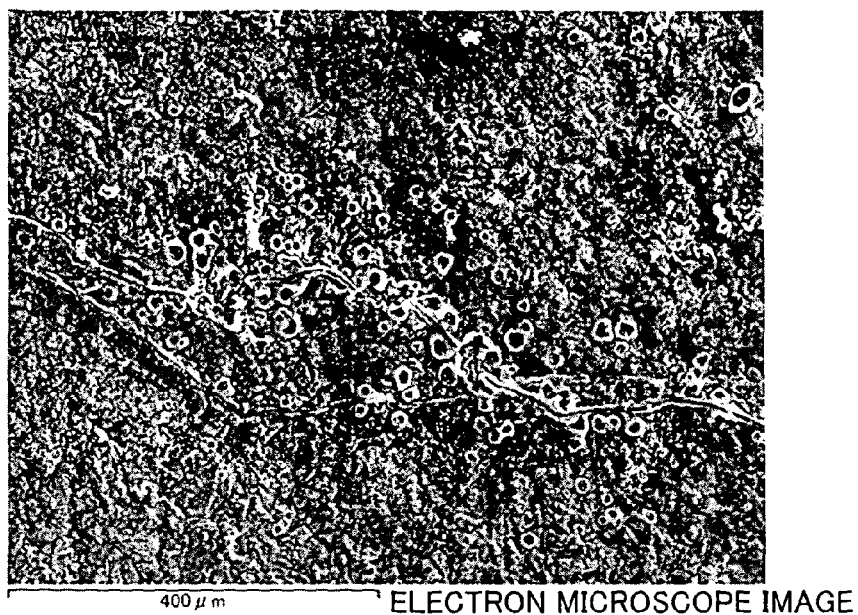
FIG. 12 is an SEM secondary electron image of the sample of Comparative Example 2.
Figure 13:
FIG. 13 is a diagram that shows a result of EDS mapping for the sample of Comparative Example 2.
Figure 14:
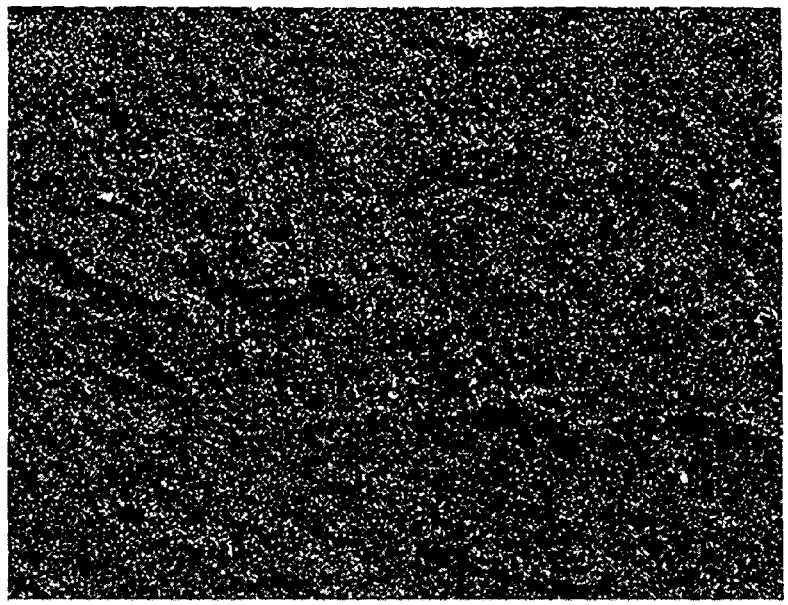
FIG. 14 is a diagram that shows a result of EDS mapping for the sample of Comparative Example 2.
Figure 15:
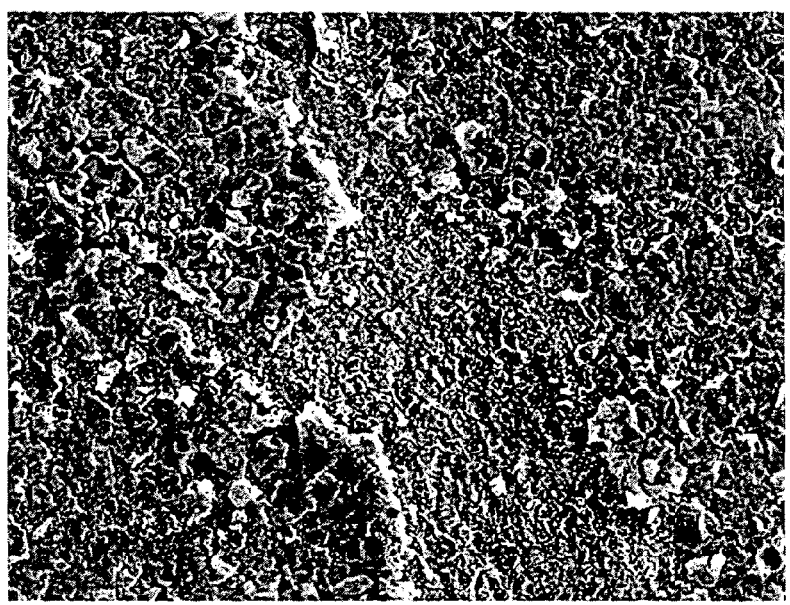
FIG. 15 is an SEM secondary electron image of the sample of Comparative Example 3.
Figure 16:
FIG. 16 is a diagram that shows a result of EDS mapping for the sample of Comparative Example 3.
Figure 17:
FIG. 17 is a diagram that shows a result of EDS mapping for the sample of Comparative Example 3.
Figure 18:
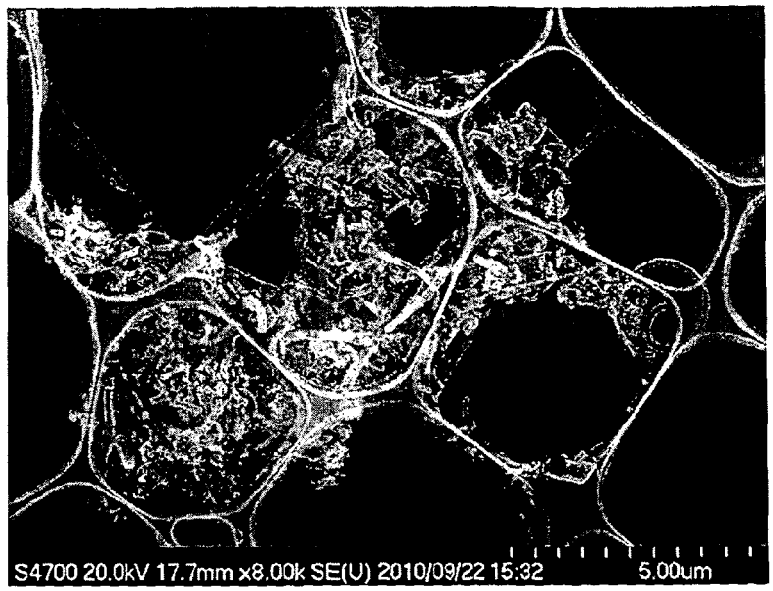
FIG. 18 is a TEM image of the carbon film that was formed on a surface of the sample of Example.
Figure 19:
FIG. 19 is a TEM image of the carbon film that was formed on a surface of the sample of Example.
Figure 20:
FIG. 20 is a TEM image of the carbon film that was formed on a surface of the sample of Example.
Figure 21:
FIG. 21 is a TEM image of the carbon film that was formed on a surface of the sample of Example.

First, Example is compared with Comparative Examples 1 to 3 to consider the effects of the first step. FIG. 5 is a secondary electron image of the observation region 10 of the test piece 1 of Example, FIG. 6 is a carbon Kα ray image of the same region as shown in FIG. 5, and FIG. 7 is an oxygen Kα ray image of the same region as shown in FIG. 5. FIG. 8 is an enlarged view of the untreated surface 11 in the observation region 10 that is shown in FIG. 5, and FIG. 9 is an enlarged view of the treated surface 12 in the observation region 10 that is shown in FIG. 5. FIG. 10 is a secondary electron image of the observation region 10 of the test piece 1 of Comparative Example 1, and FIG. 11 is a carbon Kα ray image of the same region as shown in FIG. 10. FIG. 12 is a secondary electron image of the observation region 10 of the test piece 1 of Comparative Example 2, FIG. 13 is a carbon Kα ray image of the same region as shown in FIG. 12, and FIG. 14 is an oxygen Kα ray image of the same region as shown in FIG. 12. FIG. 15 is a secondary electron image of the observation region 10 of the test piece 1 of Comparative Example 3, FIG. 16 is a carbon Kα ray image of the same region as shown in FIG. 15, and FIG. 17 is an oxygen Kα ray image of the same region as shown in FIG. 15. In FIGS. 6, 7, 11, 13, 14, 16 and 17, areas with a higher concentration of the target element (carbon or oxygen) are shown whiter because a larger amount of characteristic X ray of the target element (Kα ray) was emitted from areas where a larger amount of the target element was present.

FIG. 6 shows the composition information of carbon (C) as a target element, and areas where a large amount of carbon was detected look whitish. As shown in FIGS. 5, 6, 8 and 9, a large amount of carbon film was formed on the treated surface 12 and a small amount of carbon film was observed on the untreated surface 11. FIG. 11 shows the information on the composition of carbon (C). Different from Example, whitish areas were hardly present but scattered in Comparative Example 1. In other words, carbon was not present continuously on both the untreated surface 11 and the treated surface 12 and no carbon film was observed. Because the scattered carbon was able to be removed relatively easily, it is believed that soot derived from the acetylene gas adhered. When a reaction gas that was free of $H_2S$ was used, no carbon film was formed in Comparative Example 1, in which the first step was not carried out. On the contrary, even when a reaction gas that was free of $H_2S$ was used, a carbon film was formed in Example, in which diluted sulfuric acid was applied to the surface of the test piece 1 in the first step.

Next, Example is compared with Comparative Examples 2 and 3 to consider the type of the acid that is applied to the test piece. FIGS. 6, 13 and 16 show the composition information of carbon (C), and areas where a large amount of carbon was detected look whitish. FIGS. 7, 14 and 17 show the composition information of oxygen (O), and areas where a large amount of oxygen was detected look whitish. As shown in FIGS. 6 and 7, carbon (C) was detected but almost no oxygen (O) was detected in Example. This is believed to be because the growth of carbon film was promoted since Fe oxides (such as $Fe_2O_3$) that had been formed on the surface of the test piece were removed by the diluted sulfuric acid. On the other hand, as shown in FIGS. 13, 14, 16 and 17, both carbon (C) and oxygen (O) were detected in Comparative Examples 2 and 3. This is believed to be because the growth of carbon film was not promoted since Fe oxides, such as $Fe_2O_3$, were not able to be removed by the hydrochloric acid and nitric acid, which were used in Comparative Examples 2 and 3, respectively.

The carbon film that was formed in Example was observed under a transmission electron microscope (TEM). The results are shown in FIGS. 18 to 21. As shown in FIGS. 18 to 21, fibrous carbon was observed and the carbon film of Example was proved to be a nanocarbon film that contains at least one nanocarbon material that is selected from the group that consists of carbon nanocoils, carbon nanotubes and carbon nanofilaments. The TEM observation was performed using a transmission electron microscope JEM-2100, manufactured by JEOL, at an acceleration voltage of 120 kV.

Figure 22:
FIG. 22 is a TEM image of the carbon film that was formed on a surface of the sample of Example.
Figure 23:
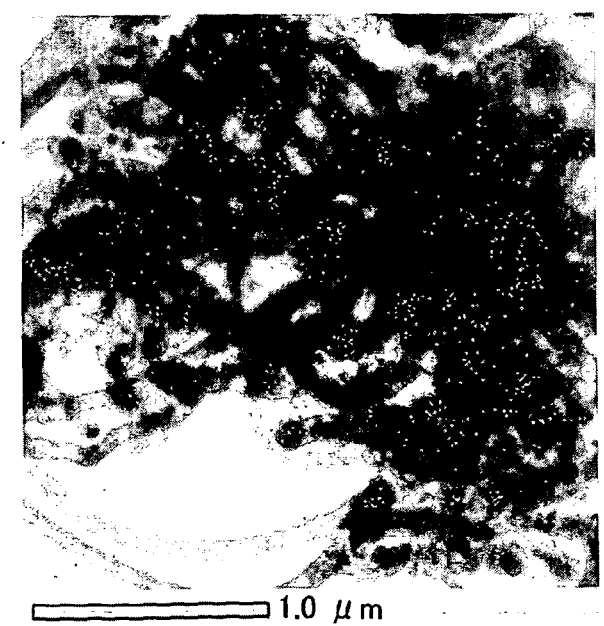
FIG. 23 is a TEM image of the carbon film that was formed on a surface of the sample of Example.
Figure 24:
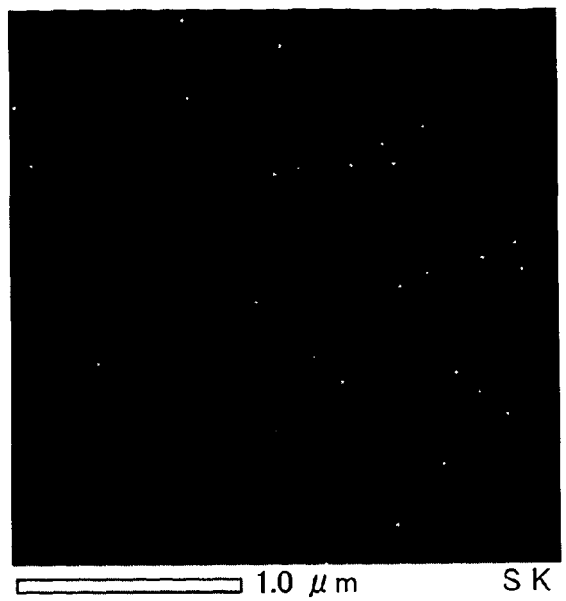
FIG. 24 is a diagram that shows a result of EDS mapping for the carbon film of Example.
Figure 25:
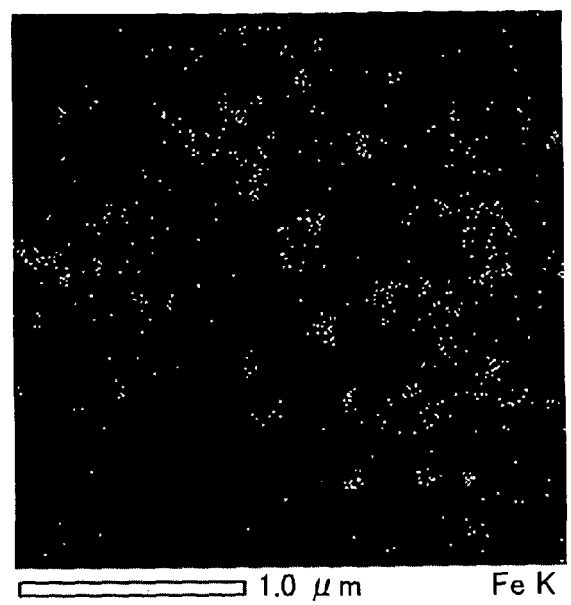
FIG. 25 is a diagram that shows a result of EDS mapping for the carbon film of Example.
Figure 26:
FIG. 26 is a TEM image of the carbon film that was formed on a surface of the sample of Example.
Figure 27:
FIG. 27 is a TEM image of the carbon film that was formed on a surface of the sample of Example.
Figure 28:
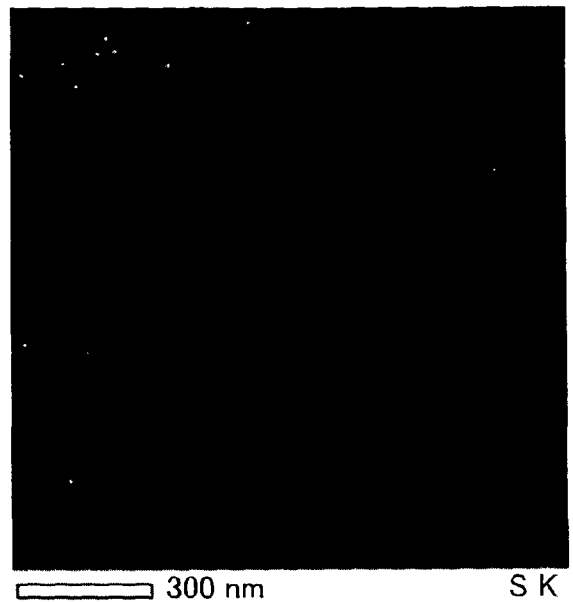
FIG. 28 is a diagram that shows a result of EDS mapping for the carbon film of Example.
Figure 29:
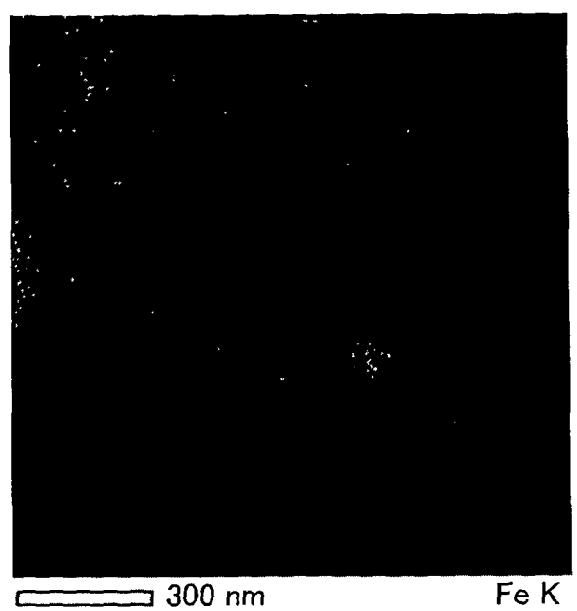
FIG. 29 is a diagram that shows a result of EDS mapping for the carbon film of Example.

In addition, TEM observation and EDS analysis were performed on the carbon film of Example using the transmission electron microscope JEM-2100. The analysis was performed on two regions, and FIGS. 22 to 25 show a result of analysis on one of the regions and FIGS. 26 to 29 show a result of analysis on the other region. FIGS. 22, 24, 26 and 28 show a result of analysis for sulfur (S). FIGS. 22 and 26 are secondary electron images, and FIGS. 24 and 28 are sulfur Kα ray images. FIGS. 23, 25, 27 and 29 shows results of analysis for iron (Fe). FIGS. 23 and 27 are secondary electron images, and FIGS. 25 and 29 are iron Kα ray images. The whitish shining dots in FIGS. 24 and 28 are areas where sulfur element was detected. The whitish shining dots in FIGS. 25 and 29 are areas where iron element was detected. As shown in FIGS. 22 to 29, iron (Fe) was detected but almost no sulfur (S) was detected in the carbon film of Example. In particular, comparison between FIG. 26 and FIG. 29 indicates that iron (Fe) was present at the tips of carbon nanofibers. It can be understood from FIGS. 26 and 29 that carbon nanofibers grew from iron (Fe) particles which serve as anchoring points for the growth of carbon nanofibers.

Figure 30:
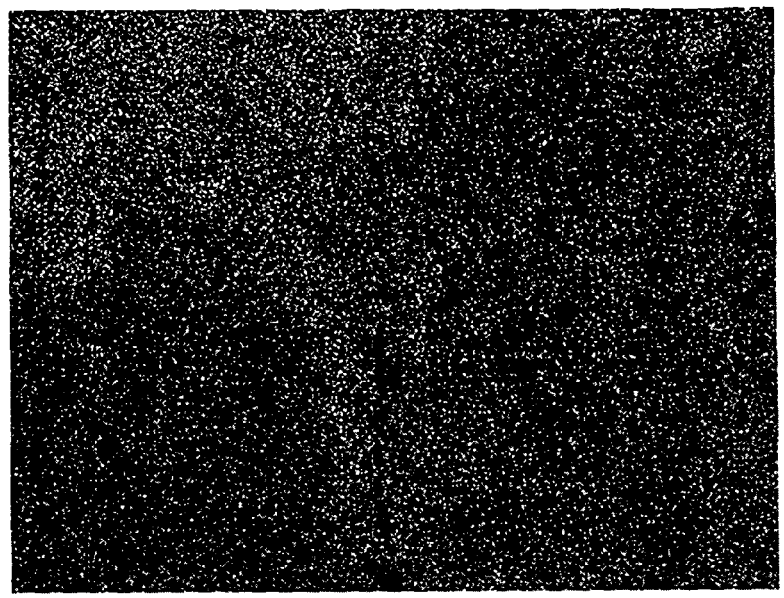
FIG. 30 is a diagram that shows a result of EDS mapping for the sample of Example.
Figure 31:
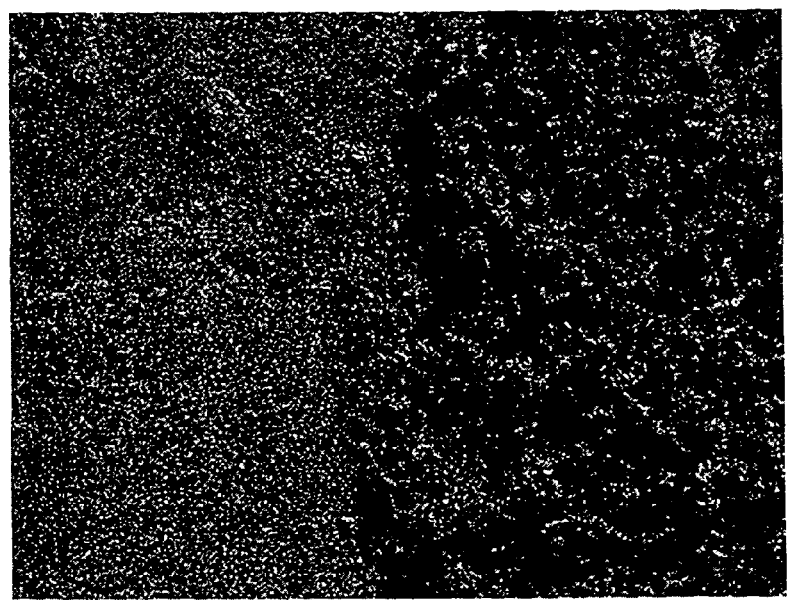
FIG. 31 is a diagram that shows a result of EDS mapping for the sample of Example.

An EDS analysis was performed on the surface of the test piece 1 of Example in the same manner as described in connection with FIG. 6 to analyze the composition of sulfur (S) and nitrogen (N) using a scanning electron microscope SUPERSCAN SS-550, manufactured by Shimadzu Corporation. FIG. 30 is a sulfur (S) Kα ray image of the same region as shown in FIG. 5, and FIG. 31 is a nitrogen (N) Kα ray image of the same region as shown in FIG. 5. As shown in FIGS. 30 and 31, both sulfur (S) and nitrogen (N) were detected in the surface of the test piece 1. According to the results that are shown in FIGS. 30 and 31, it is presumed that the sulfur (S) that was contained in the diluted sulfuric acid that was applied to the surface of the test piece 1 in the first step of Example formed a compound with Fe as a primary component of the test piece 1 and was present as $FeSO_4$ or $Fe_2(SO_4)_3$ in the surface of the test piece 1.

Figure 32:
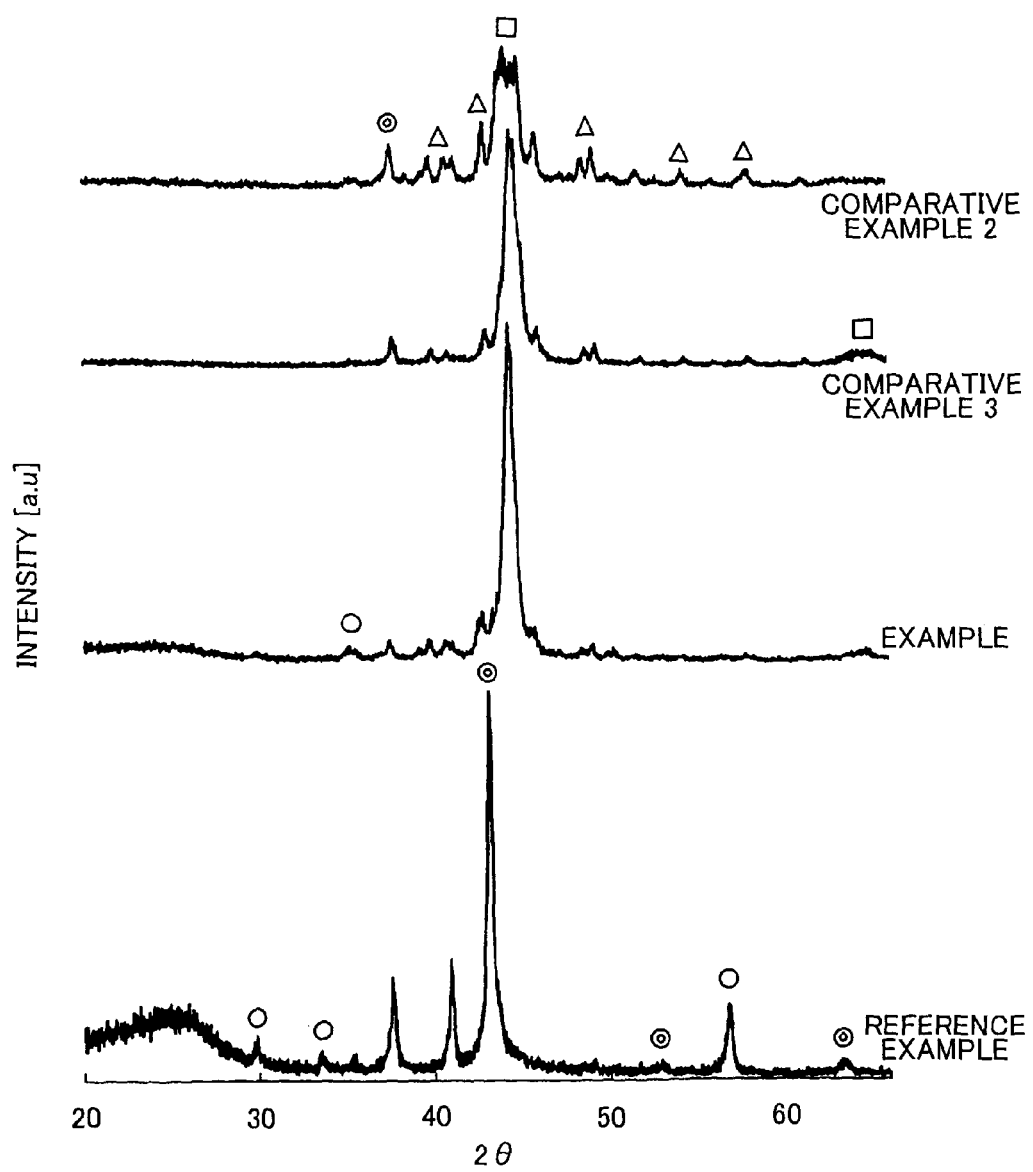
FIG. 32 is a diagram that shows results of X-ray diffraction measurement on Example, Comparative Examples and Reference Example.

FIG. 32 shows results of X-ray diffraction (XRD) measurement of the test pieces 1 of Example and Comparative Examples 2 and 3. FIG. 32 also includes, as Reference Example, a result of X-ray diffraction (XRD) measurement of a nanocarbon film that was formed on a surface of a metal material using a reaction gas that contained a hydrogen sulfide gas as disclosed in JP 2010-36194 A. In FIG. 32, the peak that is marked with an square is the peak of iron (Fe), the peak that is marked with a circle is the peak of iron sulfate ($FeSO_4$), the peak that is marked with a double circle is the peak of iron nitride ($Fe_2N$), and the peak that is marked with a triangle is the peak of iron oxide (III) ($Fe_2O_3$). As shown in FIG. 32, it was proved that iron sulfate was formed in the surface of the test pieces 1 of Example and Reference Example. It is believed that a Fe sulfate was formed in the surface of the test piece 1 of Example as in Reference Example and induced the growth of nanocarbons on the surface of the test piece 1.

The mechanism by which the presence of a Fe sulfate 52, such as $FeSO_4$, promotes the growth of nanocarbons is presumed as follows. As shown in FIG. 4, when a Fe sulfate 52, such as $FeSO_4$, is present in the surface of the test piece 1, activated carbon 4 reacts with Fe of the test piece to form a Fe—C compound 42 and therefore is suppressed from penetrating inside of the test piece 1 in the second step. It is, therefore, believed that the activated carbon 4 grows into nanocarbons 43 on the surface of the test piece 1 from the particles of Fe sulfate 52, such as $FeSO_4$, which serve as anchoring points for the growth of the nanocarbons 43.

While the examples of the present invention have been described in detail, the examples are shown only for illustrative purposes and are not intended to limit the present invention. The present invention includes various alterations and modifications of the specific examples that are shown above.

The technical elements described in this specification or the drawings exhibit technical utility when used alone or in various combinations. The technique illustrated in this specification or the drawings can achieve a plurality of objects at the same time, and the technical utility can be provided by achieving one of the objects.

The invention claimed is:

1. A surface treatment method for a metal material, comprising:
   applying diluted sulfuric acid to a surface of the metal material that is composed primarily of iron to form a Fe sulfate on the surface of the metal material;
   performing a heat treatment under nitriding conditions on the metal material, wherein heat treatment gases consist of a) $N_2$, b) at least one selected from the group consisting of CO, $CO_2$ and organic gas and c) ammonia gas, to result in
   a nitrided layer being formed in a superficial layer of the metal material on which the Fe sulfate is formed after the diluted sulfuric acid is applied to the surface of the metal material and
   a carbon film which includes at least one selected from the group consisting of carbon nanocoils, carbon nanotubes and carbon nanofilaments on a surface of the nitrided layer.

2. The surface treatment method according to claim 1, further comprising imparting stress to the superficial layer of the metal material before the diluted sulfuric acid is applied to the surface of the metal material.

3. The surface treatment method according to claim 2, wherein the stress is imparted to the superficial layer of the metal material by shot blasting.

4. The surface treatment method according to claim 1, further comprising applying fullerene to a surface of the carbon film.

5. The surface treatment method according to claim 4, further comprising sintering the metal material after the fullerene is applied to the surface of the carbon film.

6. The surface treatment method according to claim 1, wherein a concentration of the diluted sulfuric acid is equal to or higher than 0.01 mol/L and equal to or lower than 5.0 mol/L.

7. The surface treatment method according to claim 6, wherein the concentration of the diluted sulfuric acid is equal to or higher than 1.0 mol/L and equal to or lower than 5.0 mol/L.

8. The surface treatment method according to claim 6, wherein the concentration of the diluted sulfuric acid is equal to or higher than 0.3 mol/L and equal to or lower than 0.6 mol/L.

* * * * *